Patented Dec. 7, 1943

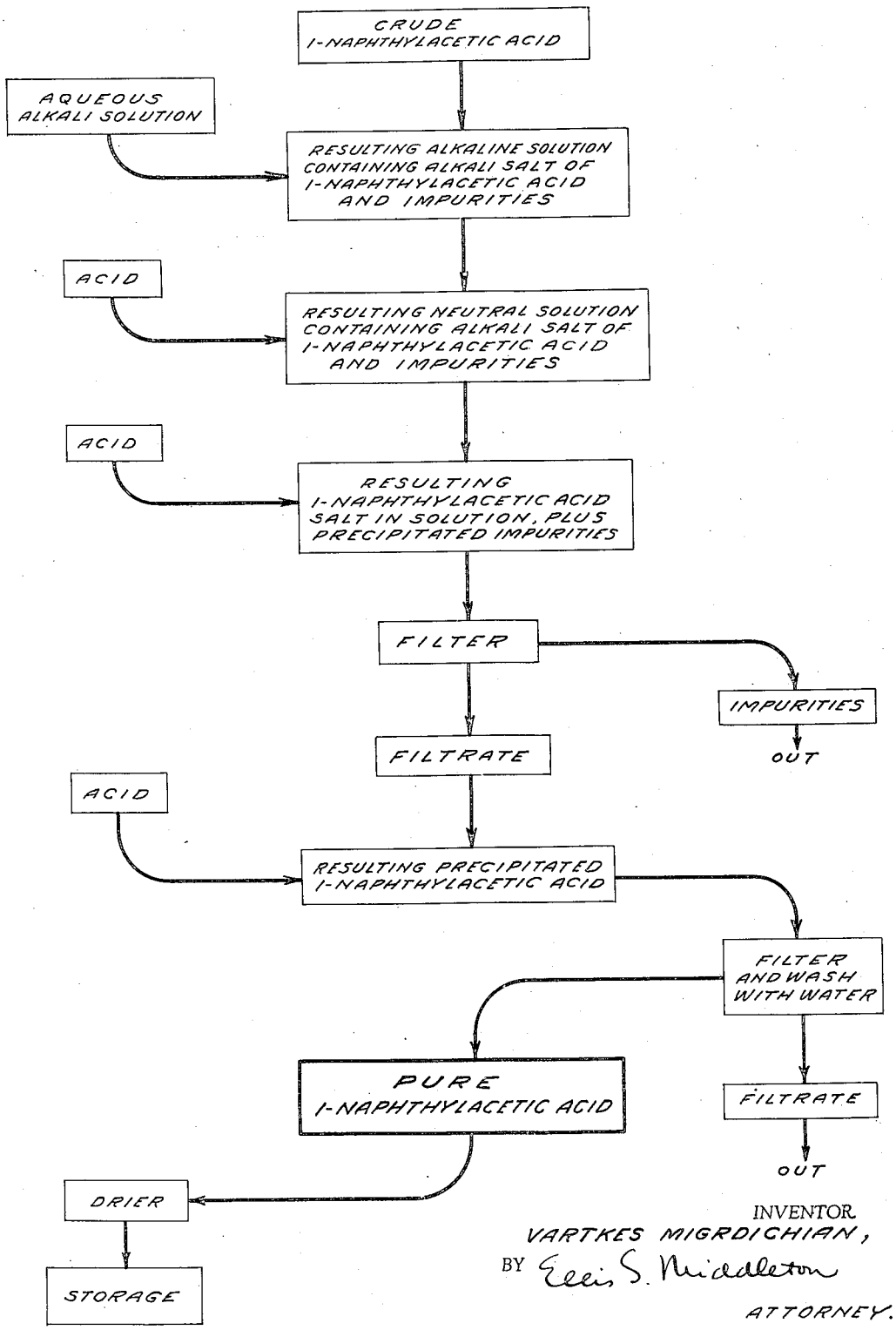

2,336,364

UNITED STATES PATENT OFFICE 2,336,364

METHOD OF REFINING CRUDE 1-NAPHTHYLACETIC ACIDS

Vartkes Migrdichian, Greenwich, Conn., assignor to American Cyanamid Company, New York, N. Y., a corporation of Maine Application February 11, 1942, Serial No. 430,359

7 Claims. (Cl. 260—525)

The present invention relates to the refining of crude 1-naphthylacetic acid.

This chemical compound is one of the many substances inducing plant response. Its synthesis in the past has presented serious difficulties from the standpoint of purity of the product. Essentially, the processes have involved the production of 1-naphthyl acetonitrile. The nitrile is then hydrolyzed by the use of either a strong alkali or strong mineral acids to produce a crude alkali salt of 1-naphthylacetic acid or the acid itself, respectively. The product thus obtained is usually discolored and contaminated with impurities (probably a mixture of complex acids) which are difficult to remove. These impurities have been found to be acid-precipitatable.

The principal object of the present invention resides in a method of refining a crude 1-naphthylacetic acid wherein the product may be readily obtained substantially free from such impurities and undesirable coloration.

Another important object is to provide 1-naphthylacetic acid in a substantially pure state by a method requiring only simple apparatus with high efficiencies.

The present invention is based upon the rather remarkable discovery that the dark colored impurities usually occurring in crude 1-naphthylacetic acid or its alkali salts are acid-precipitatable. 1-naphthylacetic acid is also acid-precipitatable. However, there appears to be a critical pH range on the acid side in which maximum quantities of the impurities are thrown down with minimum losses of 1-naphthylacetic acid. The invention therefore is primarily concerned with a purification method wherein this critical acid range is used to separate the acid-precipitatable impurities from the 1-naphthylacetic acid.

The above objects may be attained by acidifying a solution containing an alkali salt of 1-naphthylacetic acid and acid-precipitatable impurities to a point where maximum quantities of the acid precipitatable impurities will be thrown out with minimum quantities of 1-naphthylacetic acid, filtering and acid-precipitating the 1-naphthylacetic acid from the filtrate, or by dissolving a crude 1-naphthylacetic acid containing acid-precipitatable impurities in an aqueous alkali solution, neutralizing the solution, acidifying the solution to a degree sufficient to precipitate substantially all of the impurities together with a minimum quantity of the 1-naphthylacetic acid, separating out the precipitated materials, acidifying the solution and removing the thus precipitated purified 1-naphthylacetic acid.

Alkalies in aqueous solution which may be employed in dissolving the crude 1-naphthylacetic acid include those substances which produce a soluble salt of the 1-naphthylacetic acid in the solution, such as, for example, the hydroxides and carbonates of ammonium and the alkali metals. Any suitable concentration of the alkali solution may be used. However, when the more concentrated solutions are used it has been found advantageous to dilute with water when precipitating the impurities as the latter are thrown out more completely from a dilute aqueous solution.

Acids which may be employed in neutralizing the solution and precipitating first the impurities and then the 1-naphthylacetic acid include those which are more soluble in the solution than the 1-naphthylacetic acid, such as, for example, hydrochloric, sulphuric, phosphoric, nitric, or acetic.

As indicated above in this method of purification a small fraction of the 1-naphthylacetic acid is removed together with the impurities. This fraction of impure acid or several combined fractions may be treated in the same manner to recover further quantities of the substantially pure product.

Removal of the impurities is most efficiently carried out when the solution is acidified to a pH value within the range of about 6.0 to 6.8.

When refining certain grades of crude acid it may be advantageous to carry out the precipitation in more than one step, for example, acidify to a pH of about 6.7, remove the precipitated materials, then acidify to a pH of about 6.2 and remove the fraction.

Referring to the accompanying flow sheet, a preferred method of carrying out the invention comprises dissolving a quantity of the crude 1-naphthylacetic acid in 5% aqueous sodium hydroxide solution. The solution is made neutral by the addition of 20% sulphuric acid. A sufficient quantity of dilute sulphuric acid is then added to precipitate the major portion of the impurities. A small fraction of the 1-naphthylacetic acid comes down with this precipitate. The mixture is filtered to remove the impurities. The remaining 1-naphthylacetic acid is freed by adding to the filtrate slightly more than the equivalent quantity of sulphuric acid. The precipitated 1-naphthylacetic acid is removed by filtration, washed with water and dried.

The invention will be described in further detail in the following specific examples.

Example 1

100 lbs. of discolored crude 1-naphthylacetic acid are dissolved in an alkali solution prepared by dissolving 34 lbs. of sodium hydroxide in 120 gals. of water. The solution is rendered neutral to litmus by the addition of 20% sulphuric acid. 12 lbs. of 20% sulphuric acid are added under good agitation. The dark colored precipitate is filtered off, and to the clear filtrate are added 24 lbs. of 20% sulphuric acid. The precipitated 1-naphthylacetic acid is filtered off and to the filtrate are added 100 lbs. of 20% sulphuric acid. The thus precipitated purified 1-naphthylacetic acid is filtered off, washed with water and dried in an oven at 40° C. The product is a white crystalline material of 99.5% purity.

*Example 2*

100 lbs. of discolored crude 1-naphthylacetic acid are dissolved in the required quantity of 3.4% sodium hydroxide solution as in Example 1. 20% sulphuric acid is added until the pH of the solution reaches the value of 7. A sufficient quantity of 20% sulphuric acid is then added to bring the pH value within the range of 6.8 to 6.6. The dark colored precipitate is removed. 20% sulphuric acid is added to the solution until the pH value is about 6.2. The precipitated 1-naphthylacetic acid is filtered off, and to the filtrate 20% sulphuric acid is added in quantity sufficient to cause complete precipitation of the 1-naphthylacetic acid. The precipitate of pure acid is removed by filtration, washed with water and dried at 40° C.

In comparison with known methods of purification such as, for example, repeated crystallization from water or organic solvents plus treatment with a decolorizing agent, the novel method herein described is effective in removing both the impurities and undesirable coloring matter. It is a simple inexpensive method which provides a product of a high degree of purity.

While the invention has been described with particular reference to specific embodiments, it is to be understood that it is not to be limited thereto but is to be construed broadly and restricted solely by the scope of the appended claims.

I claim:

1. A method of recovering 1-naphthylacetic acid from a crude mixture of an alkali salt thereof and acid-precipitatable impurities, said mixture resulting from the preparation of 1-naphthylacetic acid by hydrolysis of naphthylacetonitrile, which includes acidifying a solution of the crude mixture to a point where maximum quantities of the acid-precipitatable impurities will be thrown out with minimum quantities of 1-naphthylacetic acid, filtering and acid-precipitating the 1-naphthylacetic acid from the filtrate.

2. A method of recovering 1-naphthylacetic acid from a crude mixture of an alkali salt thereof and acid-precipitatable impurities, said mixture resulting from the preparation of 1-naphthylacetic acid by hydrolysis of naphthylacetonitrile, which includes acidifying a solution of the crude mixture to a pH value within the range of about 6.0 to 6.8, filtering and acid-precipitating the 1-naphthylacetic acid from the filtrate.

3. A method of refining crude 1-naphthylacetic acid prepared by hydrolysis of naphthylacetonitrile which comprises dissolving the crude acid in an aqueous solution of an alkali, neutralizing the solution, acidifying the solution to a degree sufficient to precipitate substantially all of the impurities together with a minimum quantity of the 1-naphthylacetic acid, separating out the precipitated materials, acidifying the solution and recovering the thus precipitated purified 1-naphthylacetic acid.

4. Method of claim 3 wherein the alkali is a member of the group consisting of hydroxides and carbonates of ammonium and the alkali metals.

5. Method of claim 3 wherein immediately following neutralization the solution is acidified to a pH value within the range of about 6.0 to 6.8.

6. A method of refining crude 1-naphthylacetic acid prepared by hydrolysis of naphthylacetonitrile which comprises dissolving the crude acid in an aqueous solution of an alkali metal hydroxide, neutralizing the solution, acidifying the solution to a pH value within the range of about 6.0 to 6.8, separating out the precipitated materials, acidifying the solution and recovering the thus precipitated purified 1-naphthylacetic acid.

7. A method of refining crude 1-naphthylacetic acid prepared by hydrolysis of naphthylacetonitrile which comprises dissolving the crude acid in an aqueous solution of sodium hydroxide, neutralizing the solution by means of sulphuric acid, acidifying the solution by means of sulphuric acid to a pH value within the range of about 6.0 to 6.8, separating out the precipitated materials, acidifying the solution by means of sulphuric acid and recovering the thus precipitated purified 1-naphthylacetic acid.

VARTKES MIGRDICHIAN